Dec. 17, 1957 K. DEBUS 2,816,488
METHOD OF AND APPARATUS FOR TRIMMING MATRICES
Filed Feb. 9, 1954
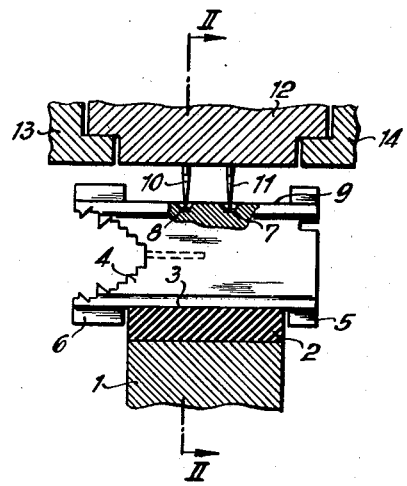
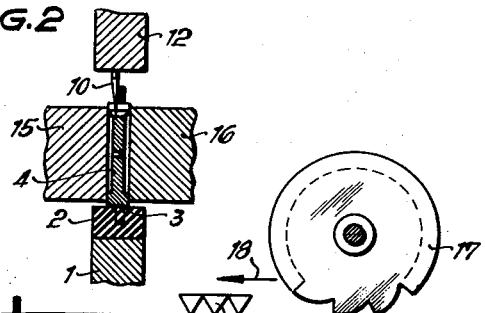
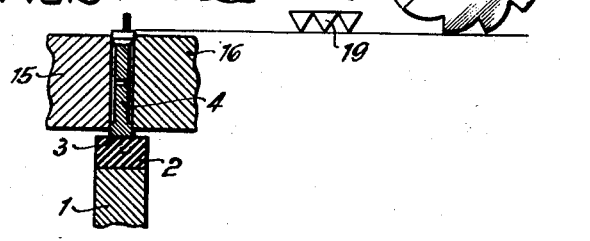

United States Patent Office 2,816,488
Patented Dec. 17, 1957

2,816,488

METHOD OF AND APPARATUS FOR TRIMMING MATRICES

Karl Debus, Bad Homburg, Germany, assignor to Linotype Gesellschaft mit beschränkter Haftung, Berlin-Tempelhof, Germany Application February 9, 1954, Serial No. 409,138

Claims priority, application Germany February 9, 1953

5 Claims. (Cl. 90—15)

This invention relates to a matrix for line casting machines, and to a method of and device for making the matrix.

In order to make the difficult and tedious make-ready of formes unnecessary, the accuracy of the type or slugs constituting the forme and hence also the accuracy of the matrices necessary for the production of these printing components must be so great that the dimensional discrepancies in the height of the slugs are less than 0.01 mm.

With the present method of manufacturing the letter matrices needed in slug casting machines, for example, it is impossible to achieve an accuracy to meet the above requirements, because the type letter or letters are only stamped in the body of the matrix after the latter is finished, at least so far as the distance between the two narrow edges of the matrix, i. e. the width of the matrix, is concerned. The depth of penetration of the dies used for stamping the type letters varies within very wide limits. It is influenced by the speed of operation of the press, the temperature, bearing play, structure of the matrix material, and by the tolerances in the width of the body of the matrix.

In the matrix according to the invention these factors which prevent the maximum precision being achieved are avoided in a simple manner as a result of the fact that the narrow edge of the matrix, which carries the stamped impression, is given precise dimensions by micro-finishing after stamping, measuring from the bottom of the impression.

In order to manufacture such a matrix according to the invention it is preferable to use a matrix which has not been machined to the desired precision either on the stamped edge or on the opposite edge, for example having just been stamped out and being still correspondingly wider, and to establish fixed points with reference to the bottom of the impression for example by measuring with calipers, with reference to which fixed points the precise depth of impression can be achieved by precise machining of the stamped edge, after which the back edge can be accurately machined with reference to this edge.

For example, a matrix may be conveyed against feeler points which rest against the bottom of the impression of the type and bring the matrix, in a precise position in relation to the bottom of the impression, to a tool, such as a planing knife, milling cutter, or grinder in which it is fixed, for example by means of clamping jaws. In this position the narrow edge of the matrix, carrying the impression, is machined by a suitable tool in such a manner that the required depth of impression, for example 1.09 mm., is achieved with the necessary precision. Starting with the impression edge, which has been thus adjusted, as a datum, the opposite narrow edge is also accurately machined and a precise distance between the two narrow edges of the matrix is thus achieved.

The principal characteristic of a device for carrying out the method according to the invention, is feeler members which make it possible to true up a matrix in relation to the bottom of the type, in such a manner that this reference surface is brought to a tool, for example a milling cutter, in a precise position. The feeler members may either be of a mechanical nature, such as needles, or may operate by electronic or optical means. In any case the matrix is located in the set position, for example by clamping, and subsequently conveyed past the machining tool, or held stationary while the tool is conveyed to the matrix in a suitable manner. In order to compensate for the differences in width still present in the body of the matrix, the support opposite the feeler member is made resilient, for example supported by a spring or lined with rubber.

An embodiment of a device for carrying out the method according to the invention is hereinafter described, by way of example, with reference to the accompanying drawings, in which:

Figure 1 shows, partially in section, the elevation of the device in the plane of the wide side of a matrix;

Figure 2 shows a section along the line II—II in Figure 1, in which clamping jaws are also shown, and Figure 3 is a similar section, without the needle carrier and needle of the device, showing a milling cutter and its method of operation.

A support 1 which can be moved up and down, is provided on its supporting side with a buffer 2 consisting, for example of rubber, on which the back edge 3, bearing the signature etc., of a matrix 4 rests, lugs 5, 6 of the matrix forming stops to ensure the location of the matrix.

Feeler needles 10, 11 reach to the bottom of stamped impressions 8, 7 on the type impression edge 9, said needles being secured in a carrier 12, which can be moved up and down in relation to stops 13, 14. The needles limit the upward position of the matrix.

The matrix 4 is held laterally by movable clamping jaws 15, 16.

For the precise machining according to the invention, matrix 4 is disposed on the elastic buffer 2 of support 1 which can move up and down. Support 1 is at this time in its lower position, and clamping jaws 15 and 16 are open. Thereupon support 1 is moved together with matrix 4 upwardly until the bottoms of stamped impressions 8, 7 contact feeler needles 10 and 11 respectively. By reason of elasticity of buffer 2, the matrix becomes so adjusted that the bottoms of the stamped impressions 7, 8 are disposed on a reference line corresponding to an imaginary line drawn through the ends of feeler needles 10 and 11.

The two clamping jaws are now closed, and the matrix is clamped in this position. A milling cutter 17 or the like is connected with the carrier 12 of both feeler needles 10 and 11 in a manner known per se and therefore not described and not shown, whereby its advance direction is in a high degree parallel to the reference line running through the ends of the needles 10 and 11.

The milling cutter 17, being moved forwards in the direction of the arrow 18, removes the material still to be milled off the edge of the matrix to be machined, and thus, by means of the finest machining, characterised by the triple triangle sign 19, brings the side to the precise dimensions to which the matrix has been set by means of the feeler needles 10, 11, and which is related to the bottom of the type impression as a datum. In another operation, the precise dimension of the width of the matrix is obtained by milling over the opposite edge.

The milling of the back edge 3 of one single matrix can be made by lowering support 1 with closed clamping jaws 15, 16 so far that the milling cutter 17 shifted in parallel to the desired amount has free way. It is, however, useful to combine a plurality of matrices to one package, the work procedure being that at first the narrow edge 9 of each matrix is brought to an exact distance relative to stamped impression bottoms 8, 7, and then the matrices combined to one single package are passed underneath e. g. a milling cutter for obtaining the exact distance of both narrow edges 9 and 3, while they stand on plane 9 as reference plane, whereby plane 3 is brought to an exact distance from plane 9.

I claim:

1. A method for the subsequent machining of matrices for slug casting machines, which matrices have been produced in the conventional manner and have on one of their narrow longitudinal sides at least one impression produced in a stamping machine, comprising the steps of pressing a matrix with its impression side by elastic means, against two precise positioning points, thereby causing the matrix to automatically so change the position of said one of its narrow sides as to press therewith against both positioning points determining a reference line for precision machining, clamping the matrix in this position, precisely machining both narrow longitudinal sides of the matrix to exactly dimension same with relation to the reference line determined by the points.

2. A method for the subsequent machining of matrices for slug casting machines, which matrices have been produced in the conventional manner and are provided with at least one impression on one narrow face thereof in a stamping machine, comprising the steps of pressing a matrix with its impression side by elastic means against two precise positioning points, thereby causing the matrix to automatically so change the position of said one of its narrow sides as to contact therewith both positioning points determining a reference line for precision machining, clamping the matrix in this position, precisely machining both narrow faces of the matrix to exactly dimension same with relation to the reference line determined by the points.

3. A method as claimed in claim 1, wherein the machining of the clamped matrix is performed exactly parallel to the reference line determined by the points.

4. A method for the automatic orientation and subsequent machining of matrices for type setting and slug casting machines, which matrices have been produced in the conventional manner, however, with excess width, and have on one of their narrow longitudinal sides at least one impression produced in a stamping machine, said impression being deeper to correspond to the excess width, comprising the steps of pressing an elastic means against the narrow longitudinal side of the matrix opposite to its impression side thereby guiding and pressing of at least one impression bottom of the matrix against the point of a feeler needle and pressing a different reference point of said impression side against a second feeler needle, the points of both said feeler needles determining a reference line orienting the matrix, clamping said so oriented matrix in this position, and precision machining of said matrix on both narrow longitudinal sides by means of tools adjusted to the reference line, to the desired depth of the impression bottom and to the desired width of the matrix.

5. A device for the subsequent machining of matrices for slug casting machines, which matrices have been produced in the conventional manner and are stamped with at least one type impression on one narrow face thereof, comprising a support of elastic material for the face opposite the impression face of a matrix, a movable carrier facing said support and provided with two feeler needles which are positioned to contact two points on the impression face of said matrix, and side clamping jaws for the matrix.

References Cited in the file of this patent

UNITED STATES PATENTS

| | | |
|---|---|---|
| Re. 12,545 | Hansen | Oct. 23, 1906 |
| 522,567 | Ten Winkel | July 3, 1894 |
| 819,842 | Benton | May 8, 1906 |
| 854,458 | Brown et al. | May 21, 1907 |
| 1,422,136 | Rousseau | July 11, 1922 |
| 1,422,137 | Rousseau | July 11, 1922 |
| 1,627,093 | Hochuli | May 3, 1927 |
| 2,359,385 | Reilly et al. | Oct. 3, 1944 |
| 2,442,022 | Schulze | May 25, 1948 |

OTHER REFERENCES

Typographical Printing Surfaces (Legros), published by Longmans, Green & Co. (London), 1931. Pages 233–238 relied on. Copy in Division 17.

Linotype News, Fall 1951, vol. 30, No. 1, pages 2 and 3. Copy available in Division 17.